United States Patent
Bartling et al.

(10) Patent No.: US 12,244,683 B2
(45) Date of Patent: *Mar. 4, 2025

(54) SERIAL DATA RECEIVER WITH EVEN/ODD MISMATCH COMPENSATION

(71) Applicant: Apple Inc., Cupertino, CA (US)

(72) Inventors: Ryan D. Bartling, Sunnyvale, CA (US); Jafar Savoj, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/319,421

(22) Filed: May 17, 2023

(65) Prior Publication Data

US 2024/0097874 A1    Mar. 21, 2024

Related U.S. Application Data

(60) Provisional application No. 63/376,208, filed on Sep. 19, 2022.

(51) Int. Cl.
| | |
|---|---|
| *H04L 23/02* | (2006.01) |
| *H04B 1/04* | (2006.01) |
| *H04L 7/00* | (2006.01) |
| *H04L 7/033* | (2006.01) |

(52) U.S. Cl.
CPC ............. *H04L 7/0029* (2013.01); *H04B 1/04* (2013.01); *H04L 7/033* (2013.01)

(58) Field of Classification Search
CPC ............ H04B 1/71055; H04B 10/2575; H04B 10/2581; H04B 10/504; H04B 10/5055; H04B 10/541; H04B 10/6165; H04B 10/5561; H04B 10/548; H04L 25/0385; H04L 1/006; H04L 25/0204; H04L 25/0225; H04L 25/4917; H04L 25/03057; H04L 27/2637; H04L 7/0025; H04L 7/0331; H04L 2027/0067; H03M 1/1215; H03M 1/0836; H03M 1/007; H03M 1/0626; H03M 1/365
USPC ......... 375/262, 260, 267, 376; 342/139–142, 342/155
See application file for complete search history.

(56) References Cited

U.S. PATENT DOCUMENTS

| | | | |
|---|---|---|---|
| 5,910,960 A | 6/1999 | Claydon et al. | |
| 6,791,995 B1 * | 9/2004 | Azenkot | H04N 7/17309 |
| | | | 725/144 |
| 8,532,240 B2 | 9/2013 | Tracy et al. | |
| 9,191,195 B2 | 11/2015 | Kuo et al. | |
| 10,483,952 B1 * | 11/2019 | Su | H04L 25/03878 |

(Continued)

OTHER PUBLICATIONS

International Search Report and Written Opinion in PCT Appl. No. PCT/US2023/032080 mailed Jan. 9, 2024, 12 pages.

*Primary Examiner* — Khai Tran
(74) *Attorney, Agent, or Firm* — Kowert, Hood, Munyon, Rankin & Goetzel, P.C.; Dean M. Munyon

(57) ABSTRACT

A serial data receiver circuit included in a computer system may include a front-end circuit, a sample circuit that includes multiple analog-to-digital converter circuits, and a recovery circuit. The sample circuit may sample a serial data stream at different times that correspond to even-numbered and odd-numbered symbols in the serial data stream. The recovery circuit may use different coefficients to process the respective samples of the even-numbered and odd-numbered symbols in order to recover the data symbols encoded in the serial data stream.

20 Claims, 11 Drawing Sheets

(56) References Cited

U.S. PATENT DOCUMENTS

| | | | |
|---|---|---|---|
| 10,720,936 B1* | 7/2020 | Xu | H03M 1/121 |
| 11,133,963 B1 | 9/2021 | Zheng et al. | |
| 11,658,671 B2* | 5/2023 | Bartling | H03M 1/129 |
| | | | 341/155 |
| 2005/0220184 A1 | 10/2005 | Huang et al. | |
| 2007/0230581 A1* | 10/2007 | Orr | H04N 19/172 |
| | | | 375/E7.181 |
| 2011/0235204 A1* | 9/2011 | Yang | G11B 20/1816 |
| 2016/0065394 A1 | 3/2016 | Sindalovsky et al. | |
| 2017/0070298 A1* | 3/2017 | Elgala | H04L 27/2697 |
| 2017/0214558 A1 | 7/2017 | Nazarathy et al. | |
| 2021/0143830 A1 | 5/2021 | Xu | |
| 2022/0302951 A1* | 9/2022 | Pandita | H04L 25/03019 |

\* cited by examiner

SERIAL DATA RECEIVER WITH EVEN/ODD MISMATCH COMPENSATION

CROSS-REFERENCE TO RELATED APPLICATIONS

This application claims benefit of U.S. Provisional Application No. 63/376,208 entitled "Serial Data Receiver with Even/Odd Mismatch Compensation", filed on Sep. 19, 2022, which is incorporated by reference herein in its entirety.

BACKGROUND

Technical Field

This disclosure relates to the field of high-speed communication interface design and, in particular, to minimize symbol error rate.

Description of the Related Art

Computing systems typically include a number of interconnected integrated circuits. In some cases, the integrated circuits may communicate using communication channels or links to transmit and receive data bits. Such communication channels may support parallel communication, in which multiple data bits are transmitted in parallel, or serial communication, in which data bits are transmitted one bit at a time in a serial fashion.

Data transmitted between integrated circuits may be encoded to aid in transmission. For example, in the case of serial communication, data may be encoded to provide sufficient transitions between logic states to allow for clock and data recovery circuits to operate. Alternatively, in the case of parallel communication, the data may be encoded to reduce switching noise or to improve signal integrity.

During transmission of data, the physical characteristics of the communication channel may attenuate a transmitted signal associated with a particular data bit. For example, the impedance of wiring included in the communication channel or link may attenuate certain frequency ranges of the transmitted signal. Additionally, impedance mismatches between wires included in the communication channel and devices coupled to the communication channel may induce reflections of the transmitted signal, which may degrade subsequently transmitted signals corresponding to other data bits.

DETAILED DESCRIPTION OF EMBODIMENTS

Figure 1:
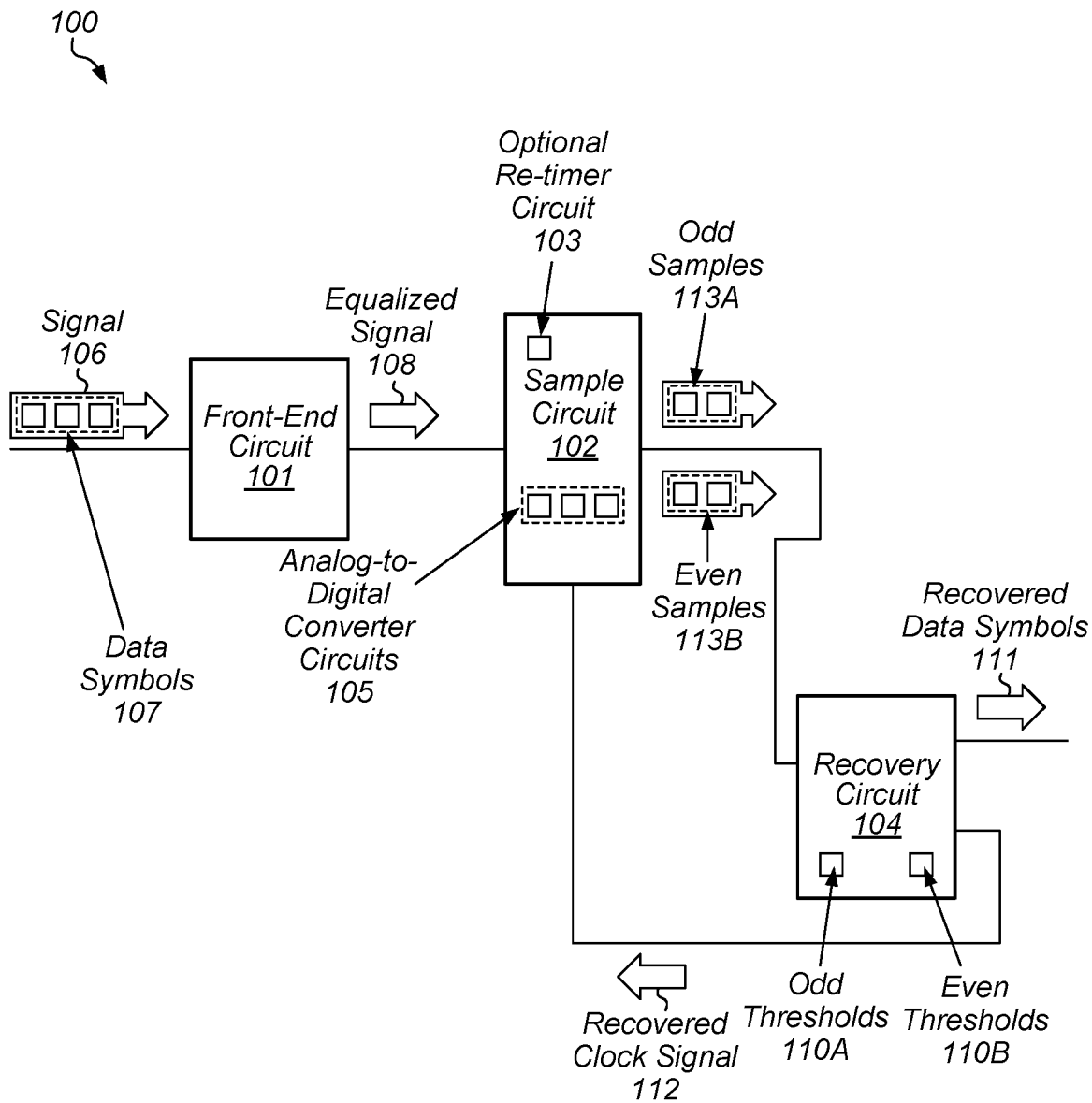
FIG. 1 is a block diagram of an embodiment of an ADC-based receiver circuit for a computer system.

A computing system may include one or more integrated circuits, such as, e.g., a central processing unit (CPU) and memories. Various integrated circuits included in the computing system may communicate through either a serial or parallel interface. In a parallel interface, multiple data bits are communicated simultaneously, while in a serial interface, data is communicated as a series of sequential single data bits. When employing a serial interface to communicate data between two devices included in a computing system, the data may be transmitted according to different protocols. For example, the data may be transmitted using a return to zero (RZ) protocol, a non-return to zero (NRZ) protocol, a pulse amplitude modulation (PAM), or any suitable combination thereof.

Serial data streams are often transmitted without an accompanying clock signal. In such cases, a clock signal is recovered from the serial data stream (in a process referred to as "clock recovery") and used for sampling the serial data stream to determine the values of the included data symbols. Various techniques can be employed to recover a clock signal. For example, a receiver circuit may generate a clock signal whose frequency is approximately the same as that of a clock signal used to create the serial data stream. A phase-locked loop circuit may then be used to phase align the clock signal with transitions in the serial data stream. Alternatively, the serial data stream may be oversampled, i.e., sampled at a higher frequency than that of the clock signal used to generate the serial data stream.

The process of recovering a clock signal from a serial data stream is invariably imperfect, resulting in the edges of the clock signal deviating from their ideal positions. This deviation in the clock edges is referred to as "jitter" and can be the result of various effects within a circuit, such as power supply noise, thermal noise, ground bounce, and the like.

Receiver circuits for serial data streams may be analog based, or they may employ analog-to-digital converter (ADC) circuits. ADC-based receiver circuits convert an equalized version of input data signals into bits in the digital domain, allowing additional processing (e.g., feed-forward equalization) to be performed as digital signal processing operations.

In addition to jitter induced in the transmitted signals by the physical characteristics of the channel, duty-cycle-distortion (DCD) in a transmitter circuit can induce different pulse responses for even and odd numbered symbols in a serial data stream. The effect of different pulse responses for even and odd numbered symbols in the serial data stream can be further increased by mismatch in level separation (referred to as "level separation mismatch ratio" or "$R_{LM}$") between different symbol values for even and odd numbered symbols.

When recovering the transmitted symbols, the difference in pulse responses and the mismatch in level separation between even and odd numbered symbols can result in higher error rates for one or both of the even or odd numbered symbols. For example, compensating for even-numbered symbols can lead to higher error rates of odd-numbered symbols and vice versa. Attempting to sample and process both even-numbered and odd-numbered samples in the same way can lead to higher error rates for both.

The embodiments illustrated in the drawings and described below provide techniques for compensating for different pulse responses and mismatch in level separation for even-numbered and odd-numbered symbols in serial data recovery. By using different sampling thresholds for even and odd symbols or different coefficients for post-processing the even and odd symbols, error rates associated with the different pulse responses and mismatches in level separation can be reduced.

A block diagram depicting an embodiment of a receiver circuit is illustrated in FIG. 1. As illustrated, receiver circuit 100 includes front-end circuit 101, sample circuit 102, and recovery circuit 104. In various embodiments, sample circuit 102 includes optional re-timer circuit 103.

Front-end circuit 101 is configured to generate equalized signal 108 using signal 106. In some embodiments, signal 106 encodes a serial data stream that includes data symbols 107. In various embodiments, signal 106 may encode data symbols 107 according to one of various symbol encodings. For example, signal 106 may be transmitted according to RZ, NRZ, PAM3, or any other suitable symbol encoding.

Sample circuit 102 includes analog-to-digital converter circuits 105. A first subset of analog-to-digital converter circuits 105 are configured to sample, using recovered clock signal 112, equalized signal 108 at times corresponding to odd-numbered data symbols of data symbols 107 to generate odd samples 113A. A second subset of analog-to-digital converter circuits 105 are configured to sample, using recovered clock signal 112, equalized signal 108 at times corresponding to even-numbered data symbols of data symbols 107 to generate even samples 113B. By using different sampling thresholds, sample circuit 102 can compensate for differences in odd-numbered and even-numbered data symbols in data symbols 107 resulting from duty-cycle distortion or level mismatch.

With multiple analog-to-digital converter circuits operating in rapid succession, odd samples 113A and even samples 113B may be generated sequentially at the arrival frequency of data symbols 107. Such an arrival frequency may be too high for recovery circuit 104 to process. In such cases, a re-timer circuit, such as re-timer circuit 103, may adjust the timing of odd samples 113A and even samples 113B. Re-timer circuit 103 is, in various embodiments, configured to re-time odd samples 113A and even samples 113B. In some cases, the re-timed odd samples 113A and even samples 11B may be timed to a single clock phase. In some cases, a frequency of re-timed odd samples 113A and even samples 113B is less than a frequency of data symbols 107.

Recovery circuit 104 is configured to generate recovered data symbols 111 and recovered clock signal 112 using odd samples 113A and even samples 113B. As described below, to generate recovered data symbols 111 and recovered clock signal 112, recovery circuit 104 may be further configured to perform additional equalization operations (e.g., feed-forward equalization) using odd samples 113A and even samples 113B. Since a given one of odd samples 113A and even samples 113B includes multiple bits whose values collectively correspond to a voltage level of signal 106 at a given point in time, recovery circuit 104 can perform its functions in the digital domain. In various embodiments, portions of recovery circuit 104 may be implemented using digital signal processing (DSP) techniques.

Figure 2:
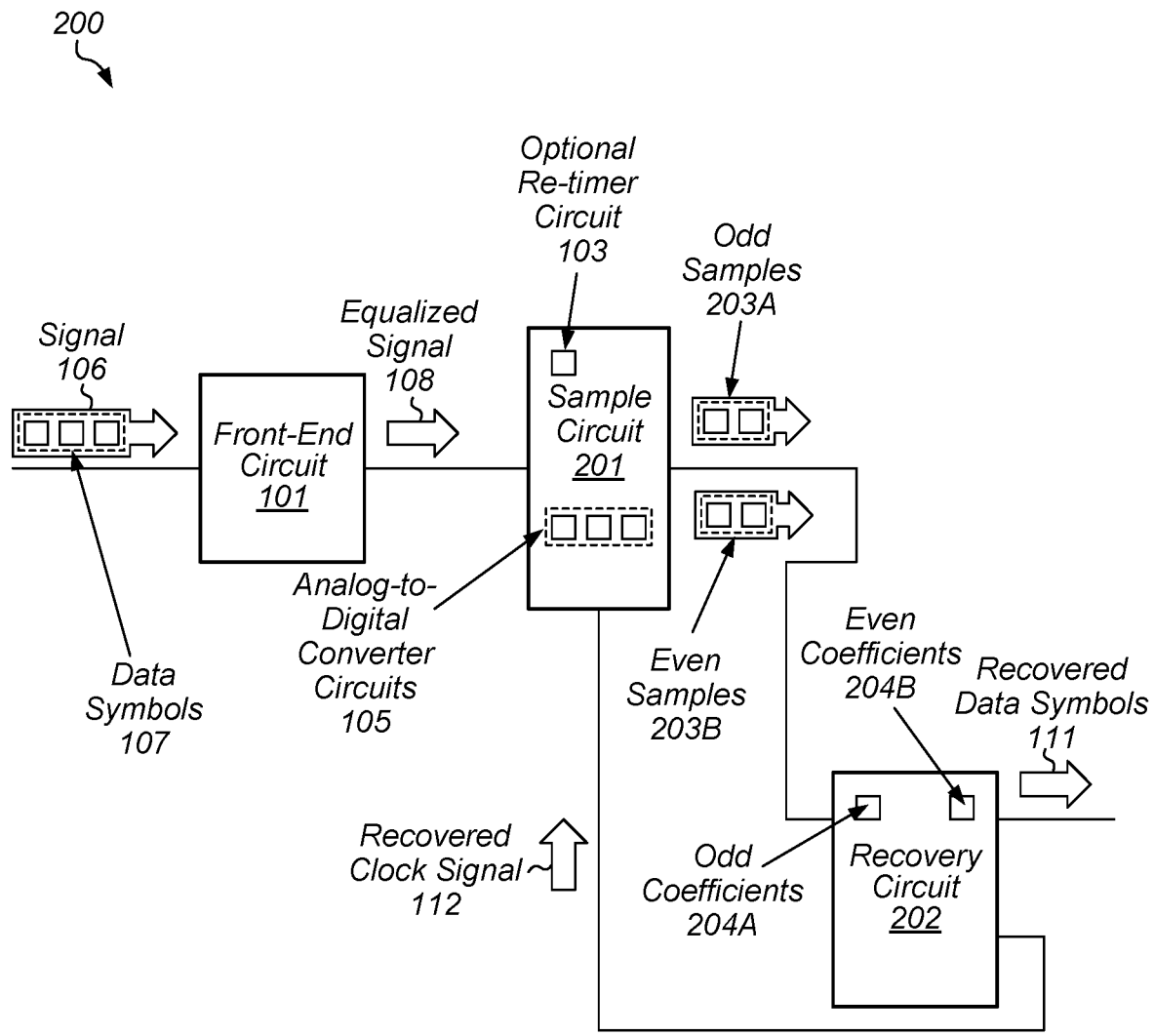
FIG. 2 is a block diagram of another embodiment of a receiver circuit for a computer system.

In the embodiment of FIG. 1, different sampling thresholds are employed to adjust for variations between even-numbered and odd-numbered data symbols. In other embodiments, different techniques can be used to adjust for the aforementioned variations. Another embodiment of a receiver circuit is depicted in FIG. 2. As illustrated, receiver circuit 200 includes front-end circuit 101, sample circuit 201, and recovery circuit 202. In various embodiments, sample circuit 201 includes optional re-timer circuit 103.

Sample circuit 201 includes analog-to-digital converter circuits 105. A first subset of analog-to-digital converter circuits 105 are configured to sample, using recovered clock signal 112, equalized signal 108 at times corresponding to odd-numbered data symbols of data symbols 107 to generate odd samples 203A. A second subset of analog-to-digital converter circuits 105 are configured to sample, using recovered clock signal 112, equalized signal 108 at times corresponding to even-numbered data symbols of data symbols 107 to generate even samples 203B.

Recovery circuit 202 is configured to generate recovered data symbols 111 and recovered clock signal 112 using odd samples 203A and even samples 203B. As described below, to generate recovered data symbols 111 and recovered clock signal 112, recovery circuit 202 may be further configured to perform additional equalization operations (e.g., feed-forward equalization) using odd samples 203A and even samples 203B using odd coefficients 204A and even coefficients 204B, respectively. Since a given one of odd samples 203A and even samples 203B includes multiple bits whose values collectively correspond to a voltage level of signal 106 at a given point in time, recovery circuit 204 can perform its functions in the digital domain. In various embodiments, portions of recovery circuit 204 may be implemented using digital signal processing (DSP) techniques.

It is noted that, in some embodiments, a combination of techniques may be employed to compensate for the variation between odd-numbered and even-numbered data symbols. For example, in some embodiments, equalized signal 108 may be sampled using different sampling thresholds for odd-numbered and even-numbered data symbols, and the resultant samples may be processed using respective sets of coefficients.

Figure 3:
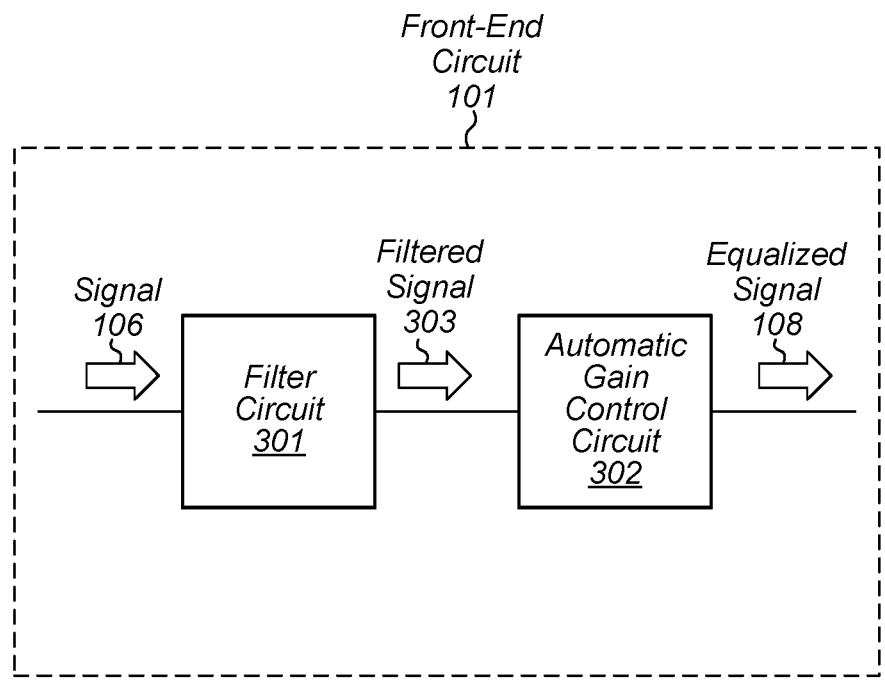
FIG. 3 is a block diagram of an embodiment of an analog front-end circuit.

As described above, front-end circuit 101 is configured to generate equalized signal 108. A block diagram of an embodiment of front-end circuit 101 is depicted in FIG. 3. As illustrated, front-end circuit 101 includes filter circuit 301 and automatic gain control circuit 302. It is noted that although front-end circuit 101 is depicted as being implemented using continuous-time linear equalization techniques, in other embodiments, other equalization techniques may be employed.

Filter circuit 301 is configured to generate filtered signal 303 using signal 106. In various embodiments, to generate filtered signal 303, filter circuit 301 may be further configured to attenuate high-frequency noise in signal 106. In some cases, filter circuit 301 may be further configured to attenuate low-frequency components at or near DC levels in signal 106.

In various embodiments, filter circuit 301 may be implemented using a series of filter circuits, each with different transfer functions. For example, filter circuit 301 may include three filter circuits. The first filter circuit may be a high-pass filter circuit, while the second and third filter circuits may be bandpass filter circuits. In some embodiments, filter circuit 301 may additionally include a variable gain amplifier circuit coupled to the output of the last of the three filter circuits.

Automatic gain control circuit 302 is configured to generate equalized signal 108 using filtered signal 303. In various embodiments, automatic gain control circuit 302 may be implemented as a closed-loop control circuit that uses feedback derived from equalized signal 108 to maintain the amplitude of the data symbols at an optimum level for sampling. In various embodiments, automatic gain control circuit 302 may include any suitable combination of attenuator and amplifier circuits that can be dynamically activated or de-activated to maintain the amplitude of the data symbols.

It is noted that although front-end circuit 101 is depicted as including filter circuit 301 and automatic gain control circuit 302, when different equalization techniques are employed, different and/or additional circuit blocks may be included.

Figure 4:
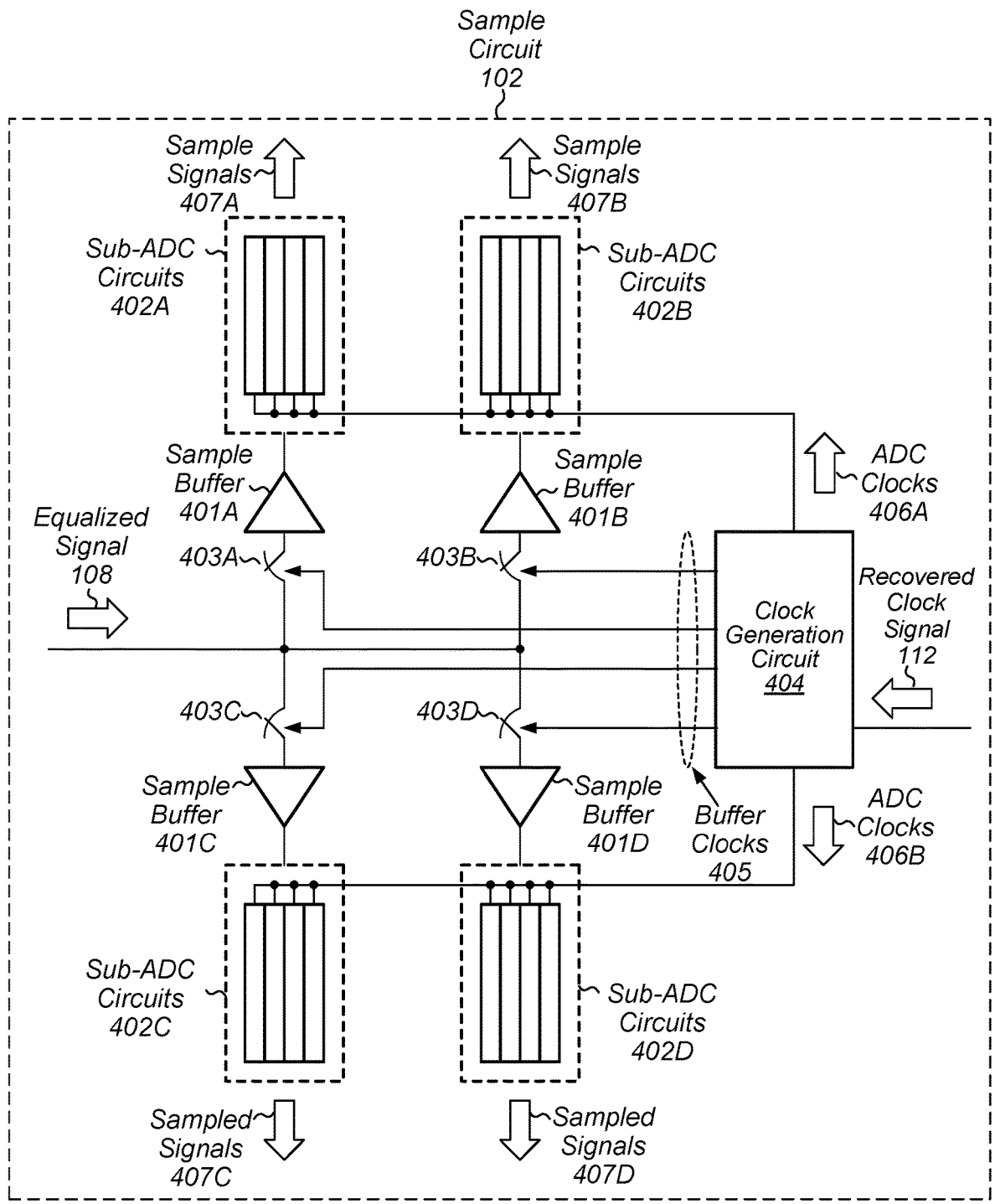
FIG. 4 is a block diagram of an embodiment of a sample circuit that employs multiple analog-to-digital converter circuits.

Turning to FIG. 4, an embodiment of sample circuit 102 is depicted. As illustrated, sample circuit 102 includes sample buffers 401A-401D, sub-analog-to-digital converter circuits (denoted as "sub-ADCs 402A-402D"), switches 403A-403D, and clock generation circuit 404. It is noted that although four sample buffers, four switches, and four sub-ADCs are depicted in the embodiment of FIG. 4, in other embodiments, different numbers of sample buffers, switches, and sub-ADCs may be employed.

Switches 403A-403D are configured to couple, using buffer clocks 405, equalized signal 108 to corresponding ones of sample buffers 401A-401D. In various embodiments, each of buffer clocks 405 may be phase shifted from each other such that only one of switches 403A-403D is closed at any given time. The respective frequencies of buffer clocks 405 may, in various embodiments, be based on a frequency of recovered clock signal 112, as well as the number of sample buffers and sub-ADCs included in sample circuit 102.

Switches 403A-403D may, in various embodiments, be implemented using one or more switch metal-oxide semiconductor field-effect transistors (MOSFETs), fin field-effect transistors (FinFETs), gate-all-around field-effect transistors (GAAFETs), or any other suitable switching devices.

Each of sample buffers 401A-401D are configured to buffer equalized signal 108 and to drive the analog-to-digital converter circuits included in corresponding ones of sub-ADCs 402A-402D. In various embodiments, sample buffers 401A-401D may be implemented as unity-gain amplifier circuits, or any other suitable circuit configured to buffer an analog signal and provide additional drive to allow for driving multiple analog-to-digital converter circuits.

Each of sub-ADCs 402A-402D include multiple analog-to-digital circuits coupled to a corresponding one of sample buffers 401A-401D and is configured to generate sampled signals 407A-407D based on a voltage level of the output of the corresponding one of sample buffers 401A-401D. In various embodiments, each of sampled signals 407A-407D may carry corresponding streams of symbols generated by corresponding ones of sub-ADCs 402A-402D. The analog-to-digital circuits included in a given one of sub-ADCs 402A-402D are activated in sequence by ADC clocks 406A and 406B.

When a given analog-to-digital converter circuit is activated, it samples the output of its corresponding sample buffer. Once the output has been sampled, there may be a period of time (referred to as a "resolution period" or a "resolve period") for the analog-to-digital converter circuit to generate multiple bits whose values correspond to the voltage level of the sampled output. The duration of the resolution period and the number of bits generated vary with the type of analog-to-digital circuit employed. In various embodiments, the total of the sample and resolution periods for the analog-to-digital converter circuits included in a given sub-ADC may be less than or equal to an active time of a corresponding one of buffer clocks 405.

The individual analog-to-digital converter circuits included in sub-ADCs 402A-402D may be implemented as flash ADCs, successive-approximation ADCs, or any other suitable type of analog-to-digital converter circuits. Although only four ADCs are depicted as being included in sub-ADCs 402A-402D, in other embodiments, any suitable number of analog-to-digital converter circuits can be employed. In such cases, clock generation circuit 404 would be configured to generate the necessary number of ADC clock signals.

Clock generation circuit 404 is configured to generate buffer clocks 405 and ADC clocks 406A and 406B. In various embodiments, clock generation circuit 404 may be implemented using phase-locked loop circuits, delay-locked loops circuits, delay circuits, or any other type of circuit suitable for generating multiple clock signals with different phases.

Figure 5:
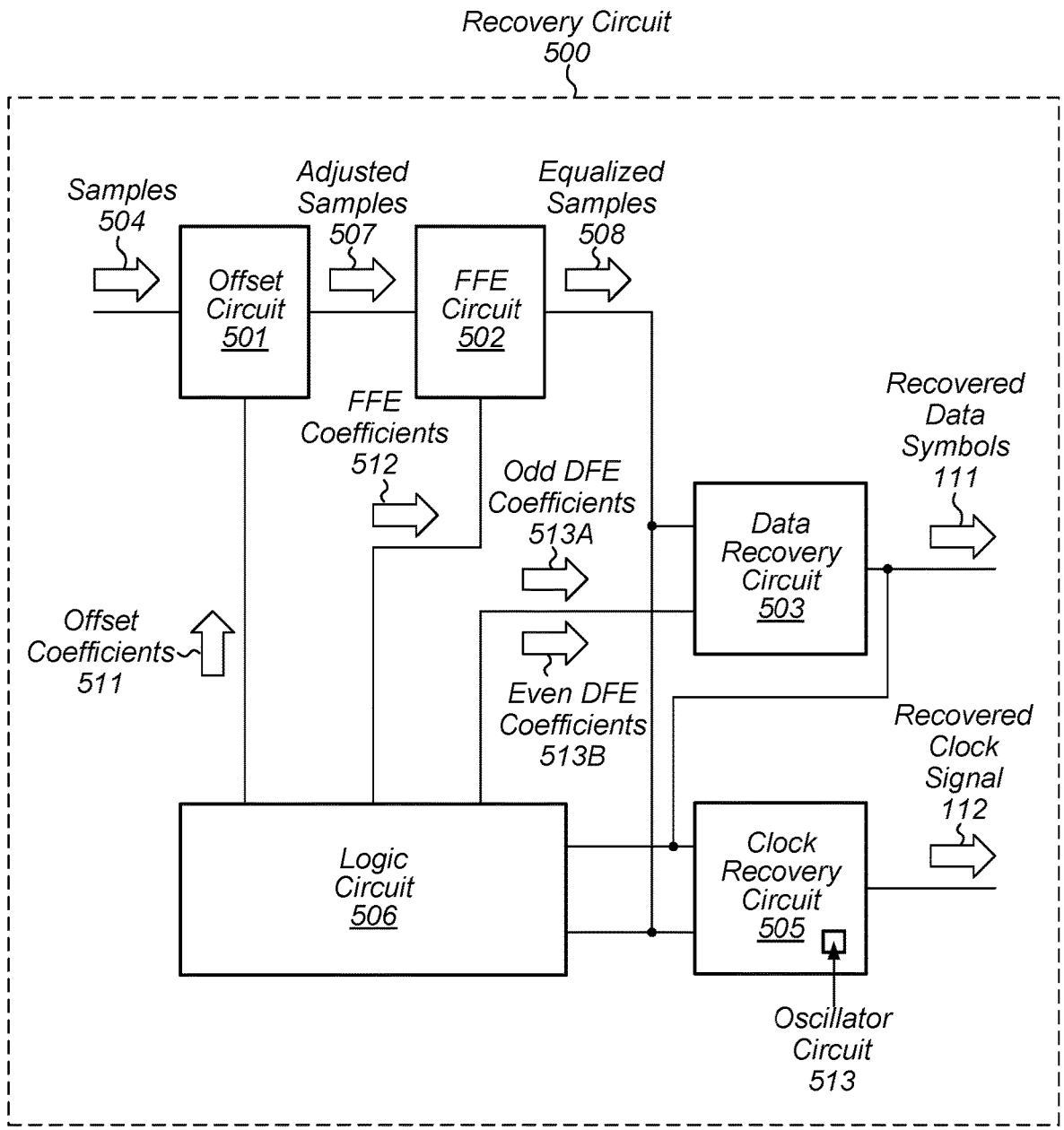
FIG. 5 is a block diagram of an embodiment of a recovery circuit for ADC-based receiver circuits.

Turning to FIG. 5, a block diagram of recovery circuit 500 is depicted. As illustrated, recovery circuit 500 includes offset circuit 501, a feed-forward equalization circuit (denoted as "FFE circuit 502"), data recovery circuit 503, clock recovery circuit 505, and logic circuit 506. It is noted that, in various embodiments, recovery circuit 500 may correspond to either of recovery circuit 104 or recovery circuit 202.

Offset circuit 501 is configured to generate, using offset coefficients 511 and samples 504, adjusted samples 507. It is noted that, in various embodiments, samples 504 may correspond to odd samples 113A and even samples 113B (or alternatively, odd samples 203A and even samples 203B). In various embodiments, samples 504 may include mismatch due to manufacturing variability across different ones of sub-ADCs 402A-402D. To correct for the mismatch, offset circuit 501 may be configured to add, based on offset coefficients 511, an offset to each sample as well as multiply each sample by a gain factor specified by offset coefficients 511. It is noted that in cases where a serializer circuit exists, operations to correct mismatch may be performed prior to serialization in order to correct samples before they are serialized. In some embodiments, offset circuit 501 may also perform a saturation function to prevent any of adjusted samples 507 going out-of-range during the adjustment process.

FFE circuit 502 is configured to perform a feed-forward equalization operation on adjusted samples 507 using FFE coefficients 512 to generate equalized samples 508. FFE circuit 502 may be configured to generate delayed versions of adjusted samples 507. FFE circuit 502 may be further configured to combine the delayed versions of adjusted samples 507 according to offset coefficients 511 to generate equalized samples 508. It is noted that there are numerous techniques by which feed-forward equalization may be performed and, in various embodiments, FFE circuit 502 may be configured to employ any suitable technique. In various embodiments, FFE circuit 502 may be implemented as a digital finite impulse response (FIR) filter.

Data recovery circuit 503 is configured to generate recovered data symbols 111 using equalized samples 508 and odd DFE coefficients 513A and even DFE coefficients 513B. In various embodiments, data recovery circuit 503 may be configured to perform a decision-feedback equalization operation as part of generating recovered data symbols 111. It is noted that there are numerous techniques by which data symbols can be recovered from equalized samples 508 and that, in various embodiments, data recovery circuit 503 may be configured to employ any suitable technique for data recovery. It is further noted that, in some embodiments, only a single set of DFE coefficients may be employed.

Clock recovery circuit 505 includes oscillator circuit 513 and is configured to generate recovered clock signal 112 using equalized samples 508 and recovered data symbols 111. In various embodiments, oscillator circuit 513 is a voltage-controlled oscillator circuit that has two control ports. A signal for one of the control ports is adjusted in response to changes in phase error indications derived from equalized samples 508 and recovered data symbols 111. This control path is referred to as a "proportional" path. In other embodiments, oscillator circuit 513 may include a single control port and information corresponding to both the proportional path and an integral path may be combined for use with the single control port. It is noted that, depending on the frequency of the signal generated by oscillator circuit 513, a frequency divider circuit may be employed.

Logic circuit 506 is configured to generate offset coefficients 511, FFE coefficients 512, odd DFE coefficients 513A and even DFE coefficients 513B using recovered data symbols 111 and equalized samples 508. For example, in some embodiments, logic circuit 506 may be configured to adapt FFE, DFE, and offset coefficients utilizing a least mean square (LMS) algorithm or any suitable adaptation algorithm.

It is noted that the embodiment of recovery circuit 104 depicted in FIG. 5 is merely an example. In other embodiments, different circuit blocks and different arrangements of circuit blocks are possible and contemplated. For example, in some cases, feed-forward equalization may be omitted, or differently adjusted samples may be used for data recovery and clock recovery circuits.

Figure 6:
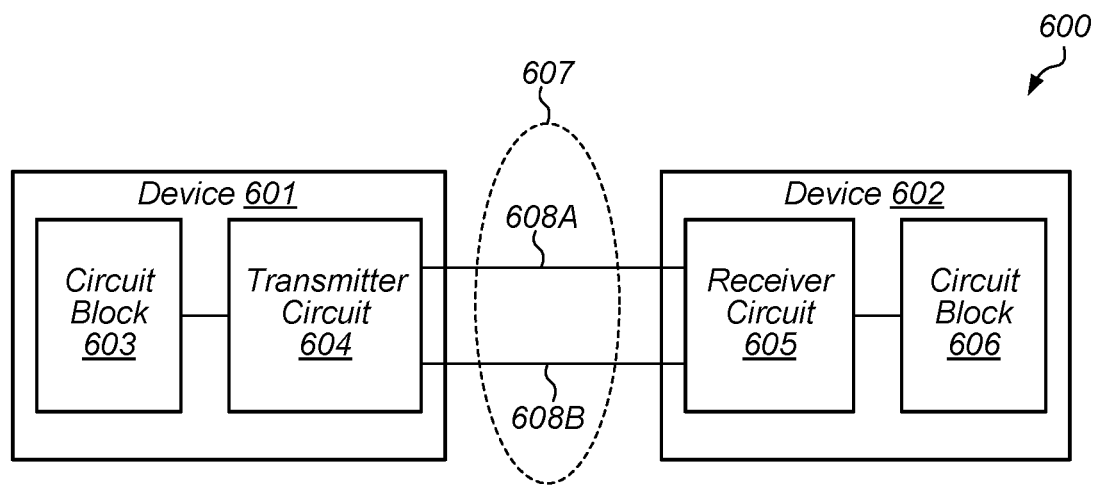
FIG. 6 is a block diagram of a computer system that includes a transmitter circuit and a receiver circuit.

As described above, a receiver circuit, such as receiver circuits 100 and 200, may be employed in a computer system. A block diagram of an embodiment of such a computer system is depicted in FIG. 6. As illustrated, computer system 600 includes devices 601 and 602, coupled by communication bus 607.

Device 601 includes circuit block 603 and transmitter circuit 604. In various embodiments, device 601 may be a processor circuit, a processor core, a memory circuit, or any other suitable circuit block that may be included on an integrated circuit in a computer system. It is noted that although device 601 only depicts a single circuit block and a single transmitter circuit, in other embodiments, additional circuit blocks and additional transmitter circuits may be employed.

Transmitter circuit 604 is configured to serially transmit signals, via communication bus 607, corresponding to data received from circuit block 603. Such signals may differentially encode one or more bits such that a difference between the respective voltage levels of wires 608A and 608B, at a particular point in time, correspond to a particular bit value. In some cases, the generation of signals may include encoding the bits prior to transmission. It is noted that although communication bus 607 is depicted as including two wires, in other embodiments, any suitable number of wires may be employed.

Device 602 includes receiver circuit 605 and circuit block 606. Like device 601, device 602 may be a processor circuit, a processor core, a memory circuit, or any other suitable circuit block configured to receive data from transmitter circuit 604. In various embodiments, receiver circuit 605 may correspond to receiver circuit 100 as depicted in FIG. 1 or receiver circuit 200 as depicted in FIG. 2.

Devices 601 and 602 may, in some embodiments, be fabricated on a common integrated circuit. In other embodiments, devices 601 and 602 may be located on different integrated circuits mounted on a common substrate or circuit board. In such cases, communication bus 607 may include metal or other conductive traces on the substrate or circuit board. Although only two devices are depicted in computer system 600, in other embodiments, any suitable number of devices may be employed.

To summarize, various embodiments of a receiver circuit for a computer system are disclosed. Broadly speaking, an apparatus is contemplated in which a front-end circuit is configured to generate an equalized signal using a plurality of signals that encode a serial data stream that includes a plurality of data symbols. A sample circuit includes a first plurality of analog-to-digital converter circuits and a second plurality of analog-to-digital converter circuits. The first plurality of analog-to-digital converter circuits are configured to sample, using a recovered clock signal and a first threshold value, the equalized signal at times corresponding to odd-numbered data symbols of the plurality of data symbols to generate a first plurality of samples. The second plurality of analog-to-digital converter circuits are configured to sample, using the recovered clock signal and a second threshold value, the equalized signal at times corresponding to even-numbered data symbols of the plurality of data symbols to generate a second plurality of samples. A recovery circuit is configured to process the first plurality of samples and the second plurality of samples to generate a plurality of recovered data symbols.

In other embodiments, the first plurality of analog-to-digital converter circuits are configured to sample, using a recovered clock signal, the equalized signal at times corresponding to odd-numbered data symbols of the plurality of data symbols to generate a first plurality of samples. The second plurality of analog-to-digital converter circuits are configured to sample, using the recovered clock signal, the equalized signal at times corresponding to even-numbered data symbols of the plurality of data symbols to generate a second plurality of samples. The recovery circuit is configured to process the first plurality of samples using a first set of coefficients, and the second plurality of samples using a second set of coefficients to generate a plurality of recovered data symbols.

Figure 7:
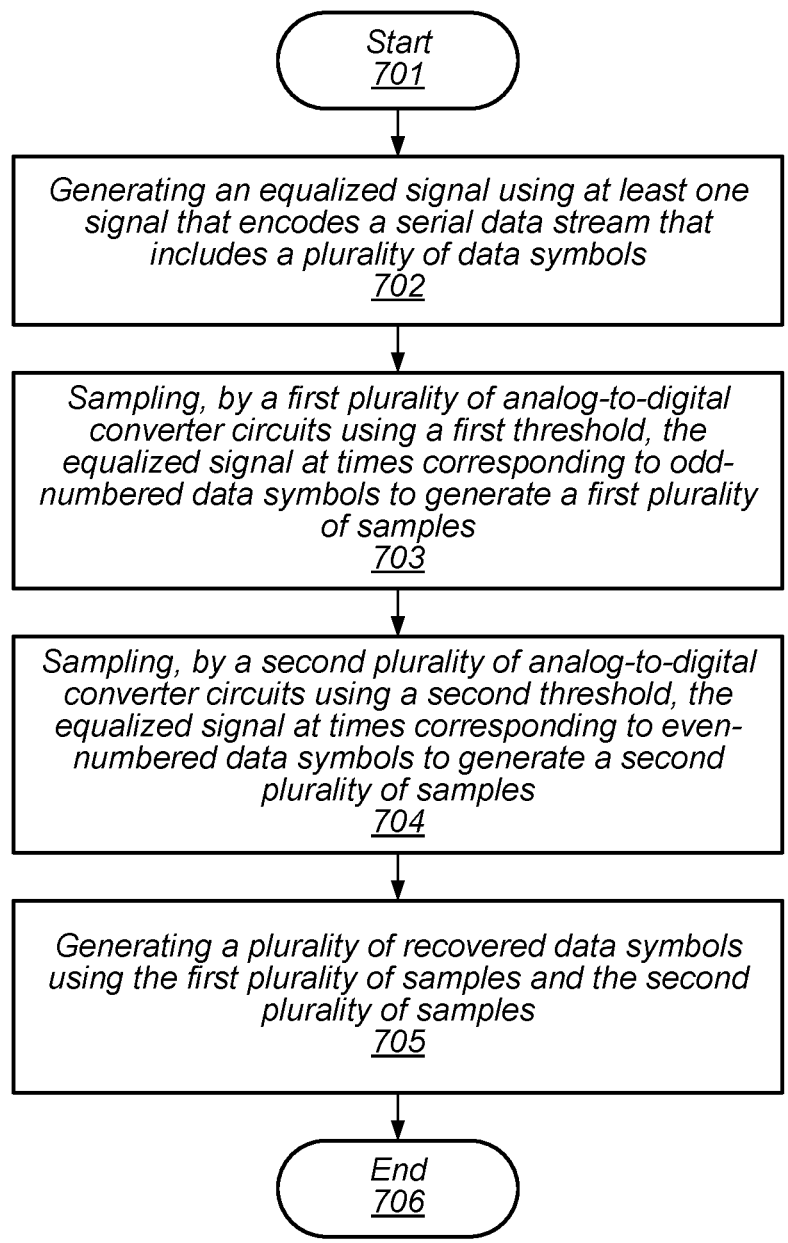
FIG. 7 is a flow diagram of an embodiment of a method for operating a receiver circuit using different sampling thresholds for odd and even data symbols.

Turning to FIG. 7, a flow diagram depicting an embodiment of a method for operating a receiver circuit for a serial data stream is depicted. The method, which may be applied to various receiver circuits such as receiver circuit 100, begins in block 701.

The method include generating an equalized signal using at least one signal that encodes a serial data stream that includes a plurality of data symbols (block 702). In some embodiments, generating the equalized signal includes filtering the at least one signal to generate a filtered signal, and adjusting a magnitude of the filtered signal to generate the equalized signal.

The method further includes sampling, by a first plurality of analog-to-digital converter circuits, the equalized signal at times corresponding to odd-numbered data symbols to generate a first plurality of samples (block 703). In various embodiments, sampling, by the first plurality of analog-to-digital converter circuits, the equalized signal includes sampling, by the first plurality of analog-to-digital converter circuits using respective ones of a plurality of sample clock signals, the equalized signal to generate the corresponding sets of first samples. In some embodiments, the plurality of sample clock signals are based on a recovered clock signal, where a given sample included in a particular set of the corresponding sets of first samples is aligned with a corresponding one of the plurality of sample clock signals.

The method also includes sampling, by a second plurality of analog-to-digital converter circuits, the equalized signal at times corresponding to even-numbered data symbols to generate a second plurality of samples (block 704). In various embodiments, sampling, by the second plurality of analog-to-digital converter circuits, the equalized signal includes sampling, by the second plurality of analog-to-digital converter circuits using respective ones of the plurality of sample clock signals, the equalized signal to generate the corresponding sets of second samples.

In some embodiments, sampling the equalized signal includes sampling, by a plurality of buffer circuits using corresponding ones of a plurality of buffer clock signals, the equalized signal to generate a corresponding plurality of buffered samples, and quantizing, by the first of plurality of analog-to-digital converters circuits, respective ones of the corresponding plurality of buffered samples to generate the corresponding sets of samples.

The method may, in some embodiments, include generating a plurality of re-timed samples using the corresponding sets of first samples and a different clock signal, wherein a frequency of the different clock signal is different than respective frequencies of the plurality of sample clock signals.

The method further includes generating a plurality of recovered data symbols using the first plurality of samples and the second plurality of samples (block 705). In some embodiments, the method also includes generating a recovered clock signal using the first plurality of samples and the second plurality of samples. In various embodiments, the method also includes generating the plurality of sample clock signals using the recovered clock signal.

Figure 8:
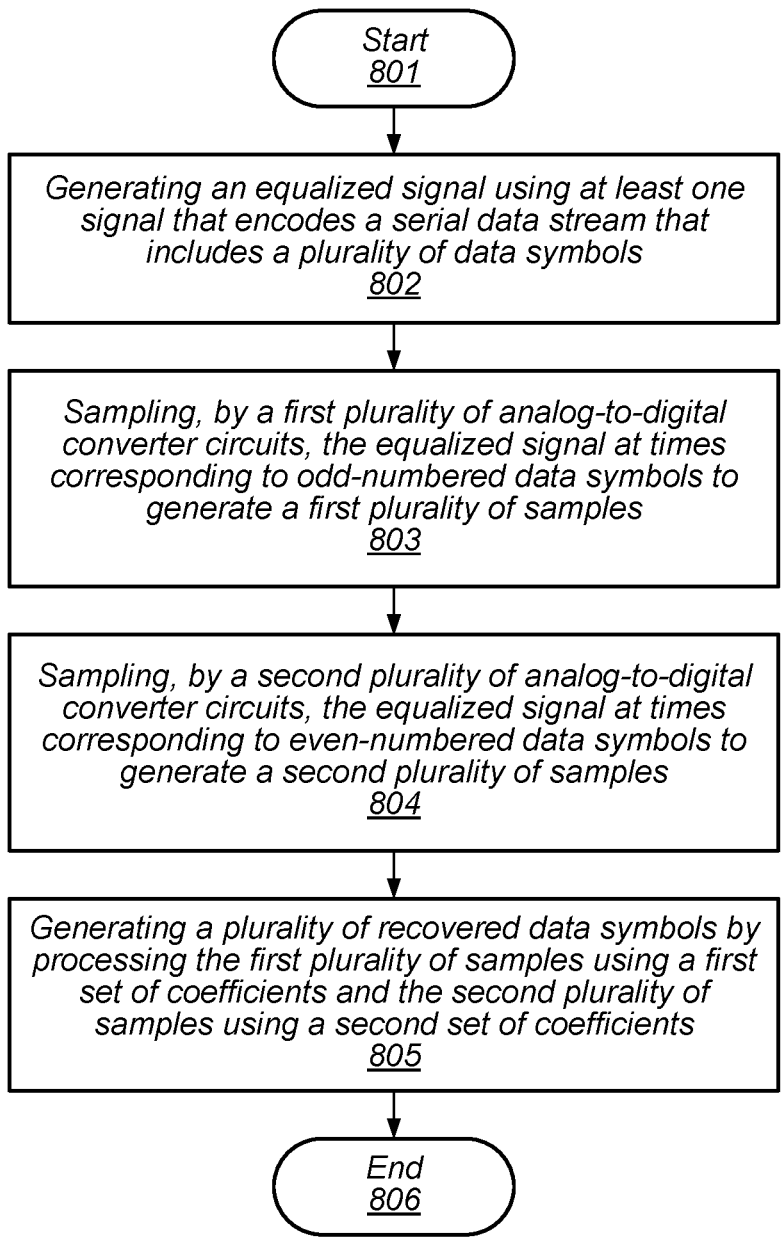
FIG. 8 is a flow diagram of an embodiment of a method for operating a receiver circuit using different coefficients for processing samples corresponding to odd and even data samples.

It is noted that one or more operations depicted in the flow diagram of FIG. 8 may be included in the method depicted in FIG. 7. The method concludes in block 706.

Turning to FIG. 8, a flow diagram depicting an embodiment of a different method for operating a receiver circuit for a serial data stream is depicted. The method, which may be applied to various receiver circuits such as receiver circuit 200, begins in block 801.

The method includes generating an equalized signal using at least one signal that encodes a serial data stream that includes a plurality of data symbols (block 802).

The method further includes sampling, by a first plurality of analog-to-digital converter circuits, the equalized signal at times corresponding to odd-numbered data symbols to generate a first plurality of samples (block 803).

The method also includes sampling, by a second plurality of analog-to-digital converter circuits, the equalized signal at times corresponding to even-numbered data symbols to generate a second plurality of samples (block 804).

The method further includes generating a plurality of recovered data symbols by processing the first plurality of samples using a first set of coefficients and the second plurality of samples using a second set of coefficients (block 805). In various embodiments, generating the plurality of recovered data symbols includes performing a first decision-feedback equalization operation on the first plurality of samples using the first set of coefficients, and performing a second decision-feedback equalization operation on the second plurality of samples using the second set of coefficients. In various embodiments, the first set of coefficients and the second set of coefficients are based on which sub-ADCs generated the first plurality of symbols and the second plurality of symbols. In some cases, the first set of coefficient and the second set of coefficients may also be based on sampling thresholds using by the sub-ADCs using to generate the first plurality of symbols and the second plurality of symbols.

It is noted that one or more steps from the method described in the flow diagram of FIG. 7 may be included in the method depicted in the flow diagram of FIG. 8. The method concludes in block 806.

Figure 9:
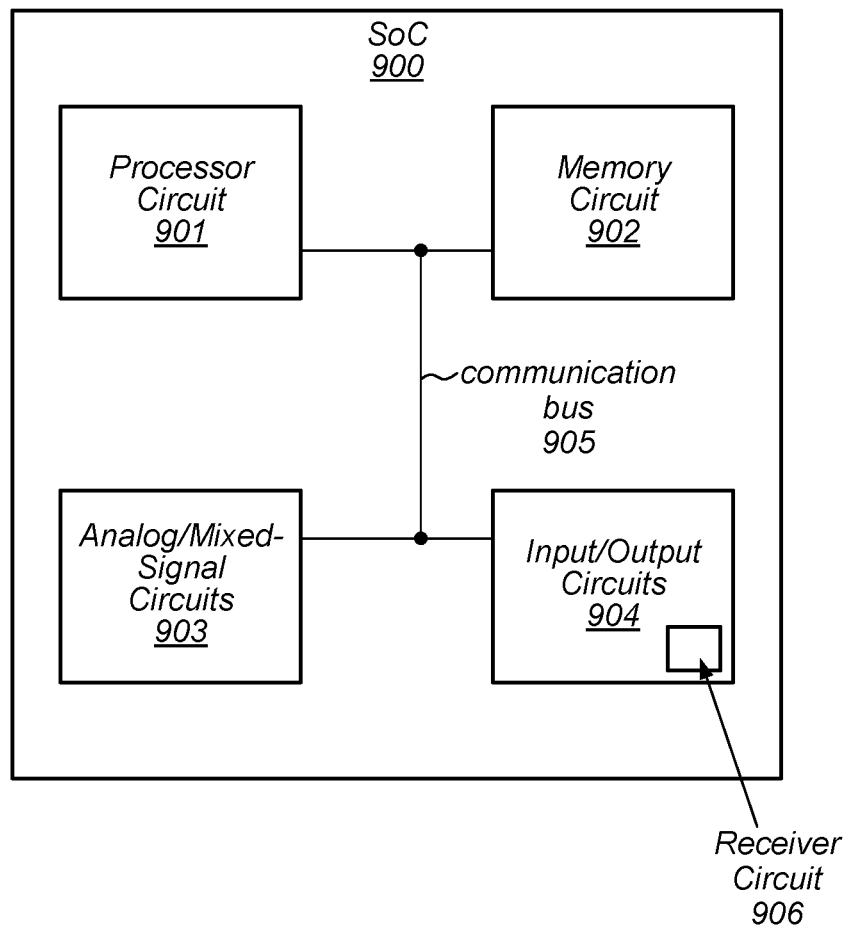
FIG. 9 is a block diagram of one embodiment of a system-on-a-chip that includes a receiver circuit.

A block diagram of a system-on-a-chip (SoC) is illustrated in FIG. 9. In the illustrated embodiment, SoC 900 includes processor circuit 901, memory circuit 902, analog/mixed-signal circuits 903, and input/output circuits 904, each of which is coupled to communication bus 905. In various embodiments, SoC 900 may be configured for use in a desktop computer, server, or in a mobile computing application such as, e.g., a tablet, laptop computer, or wearable computing device.

Processor circuit 901 may, in various embodiments, be representative of a general-purpose processor that performs computational operations. For example, processor circuit 901 may be a central processing unit (CPU) such as a microprocessor, a microcontroller, an application-specific integrated circuit (ASIC), or a field-programmable gate array (FPGA).

Memory circuit 902 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 9, in other embodiments, any suitable number of memory circuits may be employed.

Analog/mixed-signal circuits 903 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 903 may be configured to perform power management tasks with the inclusion of on-chip power supplies and voltage regulators.

Input/output circuits 904 may be configured to coordinate data transfer between SoC 900 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 904 may be configured to implement a version of Universal Serial Bus (USB) protocol or IEEE 1394 (Firewire®) protocol, and include receiver circuit 100 as depicted in FIG. 1 or receiver circuit 200 as depicted in FIG. 2.

Input/output circuits 904 may also be configured to coordinate data transfer between SoC 900 and one or more devices (e.g., other computing systems or integrated circuits) coupled to SoC 900 via a network. In one embodiment, input/output circuits 904 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 904 may be configured to implement multiple discrete network interface ports. In various embodiments, input/output circuits 904 include receiver circuit 906 which may correspond to either receiver circuit 100 or receiver circuit 200 as depicted in FIG. 1 and FIG. 2, respectively.

Figure 10:
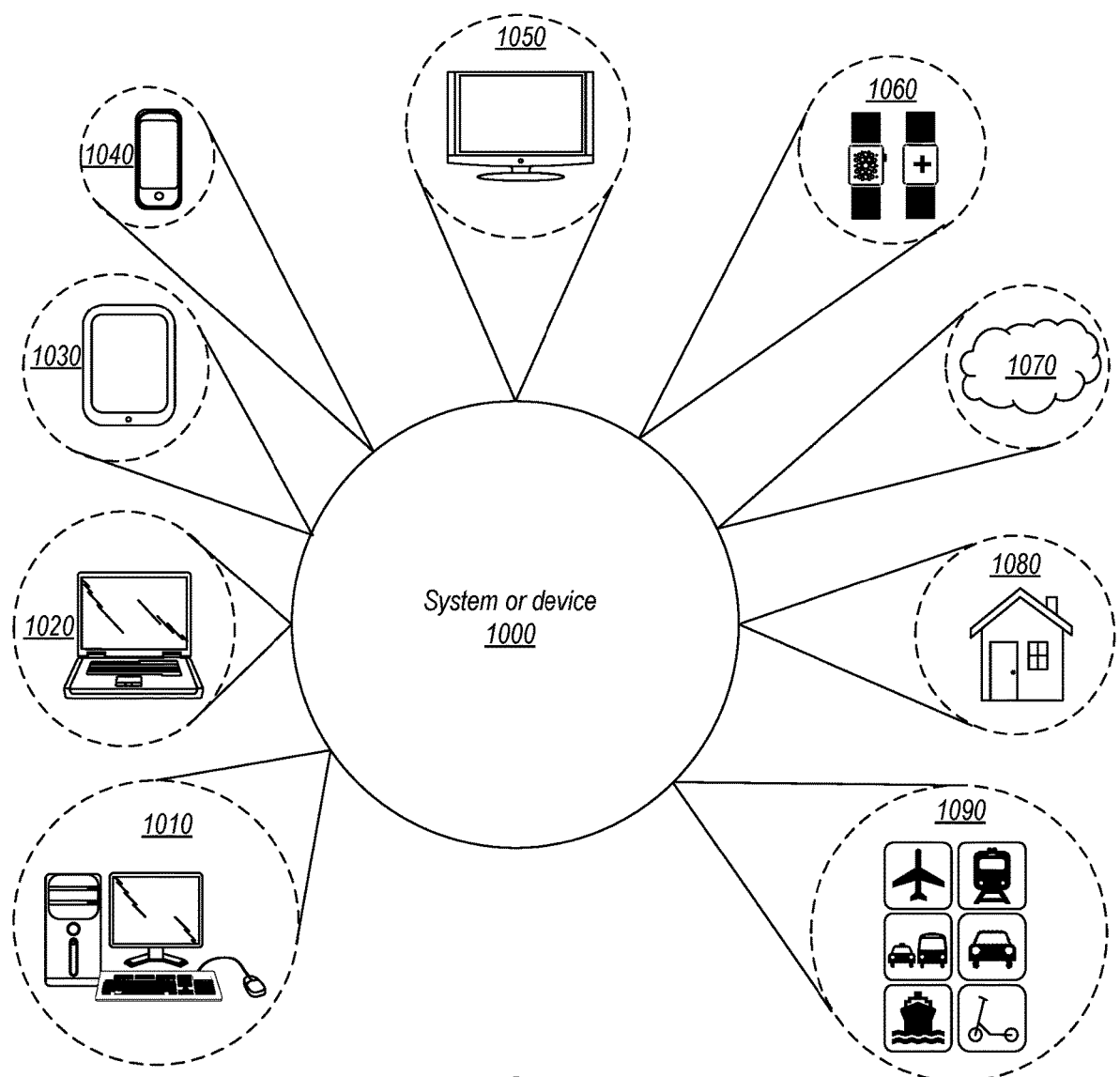
FIG. 10 is a block diagram of various embodiments of computer systems that may include receiver circuits.

Turning now to FIG. 10, various types of systems that may include any of the circuits, devices, or systems discussed above are illustrated. System or device 1000, which may incorporate or otherwise utilize one or more of the techniques described herein, may be utilized in a wide range of areas. For example, system or device 1000 may be utilized as part of the hardware of systems such as a desktop computer 1010, laptop computer 1020, tablet computer 1030, cellular or mobile phone 1040, or television 1050 (or set-top box coupled to a television).

Similarly, disclosed elements may be utilized in a wearable device 1060, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1000 may also be used in various other contexts. For example, system or device 1000 may be utilized in the context of a server computer system, such as a dedicated server or on shared hardware that implements a cloud-based service 1070. Still further, system or device 1000 may be implemented in a wide range of specialized everyday devices, including devices 1080 commonly found in the home such as refrigerators, thermostats, security cameras, etc. The interconnection of such devices is often referred to as the "Internet of Things" (IoT). Elements may also be implemented in various modes of transportation. For example, system or device 1000 could be employed in the control systems, guidance systems, entertainment systems, etc. of various types of vehicles 1090.

The applications illustrated in FIG. 10 are merely exemplary and are not intended to limit the potential future applications of disclosed systems or devices. Other example applications include, without limitation: portable gaming devices, music players, data storage devices, unmanned aerial vehicles, etc.

Figure 11:
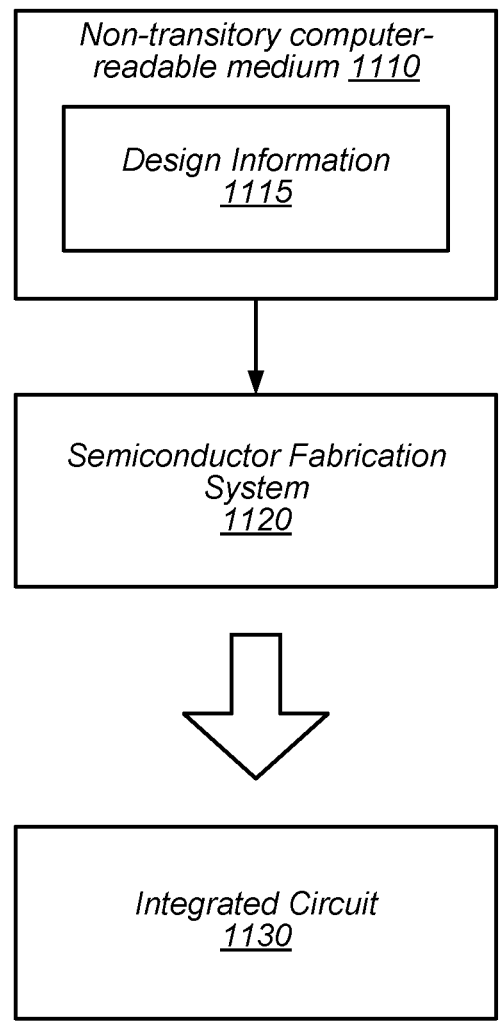
FIG. 11 illustrates an example of a non-transitory computer-readable storage medium that stores circuit design information.

FIG. 11 is a block diagram illustrating an example of a non-transitory computer-readable storage medium that stores circuit design information, according to some embodiments. In the illustrated embodiment, semiconductor fabrication system 1120 is configured to process design information 1115 stored on non-transitory computer-readable storage medium 1110 and fabricate integrated circuit 1130 based on design information 1115.

Non-transitory computer-readable storage medium 1110 may comprise any of various appropriate types of memory devices or storage devices. Non-transitory computer-readable storage medium 1110 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 1110 may include other types of non-transitory memory as well or combinations thereof. Non-transitory computer-readable storage medium 1110 may include two or more memory mediums, which may reside in different locations, e.g., in different computer systems that are connected over a network.

Design information 1115 may be specified using any of various appropriate computer languages, including hardware description languages such as, without limitation: VHDL, Verilog, SystemC, SystemVerilog, RHDL, M, MyHDL, etc. Design information 1115 may be usable by semiconductor fabrication system 1120 to fabricate at least a portion of integrated circuit 1130. The format of design information 1115 may be recognized by at least one semiconductor fabrication system, such as semiconductor fabrication system 1120, for example. In some embodiments, design information 1115 may include a netlist that specifies elements of a cell library, as well as their connectivity. One or more cell libraries used during logic synthesis of circuits included in integrated circuit 1130 may also be included in design information 1115. Such cell libraries may include information indicative of device or transistor level netlists, mask design data, characterization data, and the like, of cells included in the cell library.

Integrated circuit 1130 may, in various embodiments, include one or more custom macrocells, such as memories, analog or mixed-signal circuits, and the like. In such cases, design information 1115 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1120 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1120 may also be configured to perform various testing of fabricated circuits for correct operation.

In various embodiments, integrated circuit 1130 is configured to operate according to a circuit design specified by design information 1115, which may include performing any of the functionality described herein. For example, integrated circuit 1130 may include any of various elements shown or described herein. Further, integrated circuit 1130 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a front-end circuit configured to generate an equalized signal using a plurality of signals that encode a serial data stream that includes a plurality of data symbols;
a sample circuit including a first plurality of analog-to-digital converter circuits and a second plurality of analog-to-digital converter circuits, wherein the first plurality of analog-to-digital converter circuits are configured to sample, using a recovered clock signal, the equalized signal at times corresponding to odd-numbered data symbols of the plurality of data symbols to generate a first plurality of samples, and wherein the second plurality of analog-to-digital converter circuits are configured to sample, using the recovered clock signal, the equalized signal at times corresponding to even-numbered data symbols of the plurality of data symbols to generate a second plurality of samples; and
a recovery circuit configured to process the first plurality of samples and the second plurality of samples to generate a plurality of recovered data symbols.

2. The apparatus of claim 1, wherein the first plurality of analog-to-digital converter circuits are further configured to sample, using respective ones of a first plurality of sample clock signals, the equalized signal to generate corresponding sets of first plurality of samples, wherein the first plurality of sample clock signals are based on the recovered clock signal, and wherein a given sample included in a particular set of first plurality of samples is aligned with a corresponding one of the first plurality of sample clock signals.

3. The apparatus of claim 2, wherein the sample circuit is further configured to generate the first plurality of sample clock signals using the recovered clock signal.

4. The apparatus of claim 2, further comprising a re-timer circuit configured to generate a first plurality of re-timed samples using the first plurality of samples and a different clock signal, wherein a frequency of the different clock signal is different than respective frequencies of the first plurality of sample clock signals.

5. The apparatus of claim 2, wherein the sample circuit further includes a plurality of buffer circuits configured to sample, based on corresponding ones of a plurality of buffer clock signals, the equalized signal to generate a corresponding plurality of buffered samples, and wherein the first plurality of analog-to-digital converter circuits are configured to quantize respective ones of the corresponding plurality of buffered samples to generate the corresponding sets of first plurality of samples.

6. The apparatus of claim 1, wherein to generate the equalized signal, the front-end circuit is further configured to:
filter the plurality of signals to generate a filtered signal; and
adjust a magnitude of the filtered signal to generate the equalized signal.

7. A method, comprising:
generating an equalized signal using at least one signal that encodes a serial data stream that includes a plurality of data symbols;
sampling, by a first plurality of analog-to-digital converter circuits using a first threshold, the equalized signal at times corresponding to odd-numbered data symbols to generate a first plurality of samples;
sampling, by a second plurality of analog-to-digital converter circuits using a second threshold, the equalized signal at times corresponding to even-numbered data symbols to generate a second plurality of samples; and
generating a plurality of recovered data symbols using the first plurality of samples and the second plurality of samples.

8. The method of claim 7, further comprising generating a recovered clock signal using the first plurality of samples and the second plurality of samples, and wherein generating the equalized signal includes:
filtering the at least one signal to generate a filtered signal; and
adjusting a magnitude of the filtered signal to generate the equalized signal.

9. The method of claim 8, wherein sampling, by the first plurality of analog-to-digital converter circuits using the first threshold, the equalized signal includes sampling, by the first plurality of analog-to-digital converter circuits using respective ones of a plurality of sample clock signals, the equalized signal to generate the first plurality of samples, wherein the plurality of sample clock signals are based on the recovered clock signal, and wherein a given sample included in a particular set of the first plurality of samples is aligned with a corresponding one of the plurality of sample clock signals.

10. The method of claim 9, further comprising generating the plurality of sample clock signals using the recovered clock signal.

11. The method of claim 10, further comprising generating a plurality of re-timed samples using the first plurality of samples and a different clock signal, wherein a frequency of the different clock signal is different than respective frequencies of the plurality of sample clock signals.

12. The method of claim 11, wherein sampling the equalized signal includes:

sampling, by a plurality of buffer circuits using corresponding ones of a plurality of buffer clock signals, the equalized signal to generate a corresponding plurality of buffered samples; and quantizing, by a subset of the first plurality of analog-to-digital converter circuits and the second plurality of analog-to-digital converter circuits, respective ones of the corresponding plurality of buffered samples to generate the first plurality of samples and the second plurality of samples.

13. The method of claim 11, wherein generating the plurality of recovered data symbols includes performing a feed-forward equalization operation using the first plurality of samples.

14. An apparatus, comprising:
a front-end circuit configured to generate an equalized signal using a plurality of signals that encode a serial data stream that includes a plurality of data symbols;
a sample circuit including a first plurality of analog-to-digital converter circuits and a second plurality of analog-to-digital converter circuits, wherein the first plurality of analog-to-digital converter circuits are configured to sample, using a recovered clock signal, the equalized signal at times corresponding to odd-numbered data symbols of the plurality of data symbols to generate a first plurality of samples, and wherein the second plurality of analog-to-digital converter circuits are configured to sample, using the recovered clock signal, the equalized signal at times corresponding to even-numbered data symbols of the plurality of data symbols to generate a second plurality of samples; and
a recovery circuit configured to process the first plurality of samples using a first set of coefficients, and the second plurality of samples using a second set of coefficients to generate a plurality of recovered data symbols.

15. The apparatus of claim 14, wherein the first plurality of analog-to-digital converter circuits are further configured to sample, using respective ones of a first plurality of sample clock signals, the equalized signal to generate corresponding sets of first plurality of samples, wherein the first plurality of sample clock signals are based on the recovered clock signal, and wherein a given sample included in a particular set of first plurality of samples is aligned with a corresponding one of the first plurality of sample clock signals.

16. The apparatus of claim 15, wherein the sample circuit is further configured to generate the first plurality of sample clock signals using the recovered clock signal.

17. The apparatus of claim 15, further comprising a re-timer circuit configured to generate a first plurality of re-timed samples using the first plurality of samples and a different clock signal, wherein a frequency of the different clock signal is different than respective frequencies of the first plurality of sample clock signals.

18. The apparatus of claim 15, wherein the sample circuit further includes a plurality of buffer circuits configured to sample, based on corresponding ones of a plurality of buffer clock signals, the equalized signal to generate a corresponding plurality of buffered samples, and wherein the first plurality of analog-to-digital converter circuits are configured to quantize respective ones of the corresponding plurality of buffered samples to generate the corresponding sets of first samples.

19. The apparatus of claim 14, wherein to process the first plurality of samples, the recovery circuit is further configured to perform a decision-feedback equalization operation on the first plurality of samples using the first set of coefficients, and perform a second decision-feedback equalization operation on the second plurality of samples using the second set of coefficients.

20. The apparatus of claim 14, wherein to generate the equalized signal, the front-end circuit is further configured to:
filter the plurality of signals to generate a filtered signal; and
adjust a magnitude of the filtered signal to generate the equalized signal.

* * * * *